(12) United States Patent
Tang et al.

(10) Patent No.: US 8,908,092 B2
(45) Date of Patent: Dec. 9, 2014

(54) SYSTEMS AND METHODS TO IMPROVE SPATIAL RESOLUTION ON BACK AND FORTH SCANNING DISPLAY DEVICES

(75) Inventors: Morgan Tang, Milpitas, CA (US); Peter J. Mole, St. Albans (GB); Jayant Vivrekar, San Jose, CA (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 13/536,556

(22) Filed: Jun. 28, 2012

(65) Prior Publication Data

US 2013/0235266 A1     Sep. 12, 2013

Related U.S. Application Data

(60) Provisional application No. 61/608,235, filed on Mar. 8, 2012.

(51) Int. Cl.
*H04N 7/01* (2006.01)
(52) U.S. Cl.
USPC .................... 348/441; 348/744; 348/446
(58) Field of Classification Search
USPC ........................ 348/744, 446, E7.003
See application file for complete search history.

(56) References Cited

U.S. PATENT DOCUMENTS

| | | | |
|---|---|---|---|
| 7,978,387 B2 | 7/2011 | Chikaoka et al. | |
| 2007/0109451 A1* | 5/2007 | Pease et al. | 348/744 |
| 2008/0144150 A1 | 6/2008 | Champion et al. | |
| 2010/0073748 A1 | 3/2010 | Holmes et al. | |
| 2011/0013097 A1 | 1/2011 | Freeman et al. | |
| 2011/0080533 A1 | 4/2011 | Champion et al. | |
| 2011/0234898 A1* | 9/2011 | Goren | 348/446 |

* cited by examiner

*Primary Examiner* — Jefferey Harold
*Assistant Examiner* — Sihar Karwan
(74) *Attorney, Agent, or Firm* — Vierra Magen Marcus LLP (57) ABSTRACT

Methods, systems and devices described herein improve vertical resolution at sides of a four cornered image produced by a scanning projector display device. In accordance with an embodiment, a first plurality of frames (e.g., odd frames) of the image are scanned back and forth from side to side starting at a first line level, in one of the corners. Additionally, a second plurality of frames (e.g., even frames) of the image are scanned back and forth from side to side, starting at a vertical offset level from the first line level, in the same one of the corners. The scanning of the first plurality of frames (e.g., the odd frames) is interleaved with the scanning of the second plurality of frames (e.g., the even frames).

20 Claims, 12 Drawing Sheets

SYSTEMS AND METHODS TO IMPROVE SPATIAL RESOLUTION ON BACK AND FORTH SCANNING DISPLAY DEVICES

PRIORITY CLAIM

This application claims priority under 35 U.S.C. 119(e) to U.S. Provisional Patent Application No. 61/608,235, entitled SYSTEMS AND METHODS TO IMPROVE SPATIAL RESOLUTION ON BACK AND FORTH SCANNING DISPLAY DEVICES, filed Mar. 18, 2012, which is incorporated herein by reference.

BACKGROUND

Figure 1:
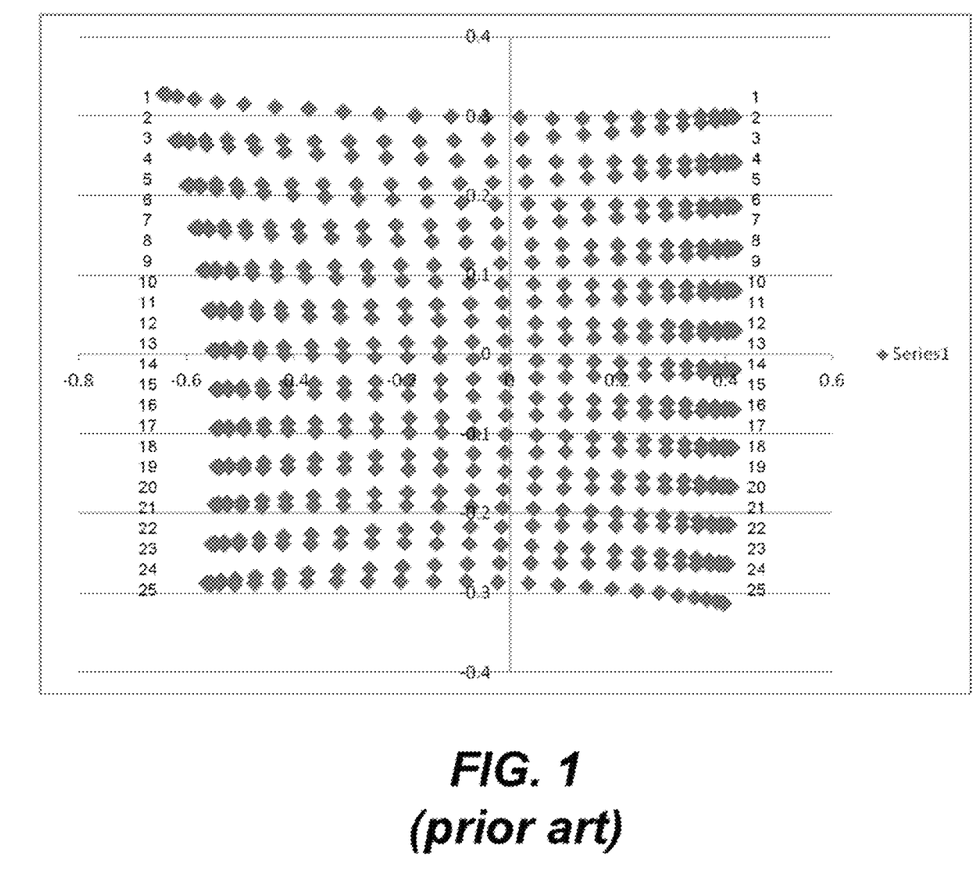
FIG. 1 illustrates a conventional scanning pattern used by scanning MEMS type projector display devices.

In conventional scanning projector display devices, such as a scanning micro-electro-mechanical system (MEMS) type projector display device, for each frame an image is scanned from left-to-right and then back from right-to-left, and so on, in a zigzag manner. This scanning technique results in limited vertical resolution on both the left and right sides of the image. More specifically, the vertical resolution on the sides is essentially half of the original vertical resolution, as can be appreciated from FIG. 1. In the example of FIG. 1, where the original horizontal by vertical resolution is 25×25 pixels, the vertical resolution at the left and right sides of the image is only 12 or 13 pixels. For another example, where the original horizontal by vertical resolution is 1280×720 pixels, the vertical resolution at the left and right sides of an image is only 360 pixels. For still another example, where original the horizontal by vertical resolution is 1366×768 pixels, the vertical resolution at the left and right sides of an image is only 384 pixels.

This reduction (halving) of the vertical resolution occurs because a scan beam is continuous when it changes its scanning direction, which has the effect of the scan beam not having even vertical spacing between the current scan line and the previous scan line. In fact, as can be appreciated from FIG. 1, the right most position of a left-to-right scan is essentially at the exact same vertical position as the right most position of the next right-to-left scan. In other words, the position at the end of one scan line is at substantially the same position that begins the next scan line. Accordingly, conventionally, for a given mechanical setup with a periodic driving scheme, there are vertical spacing gaps that will never be scanned.

Figure 2A:
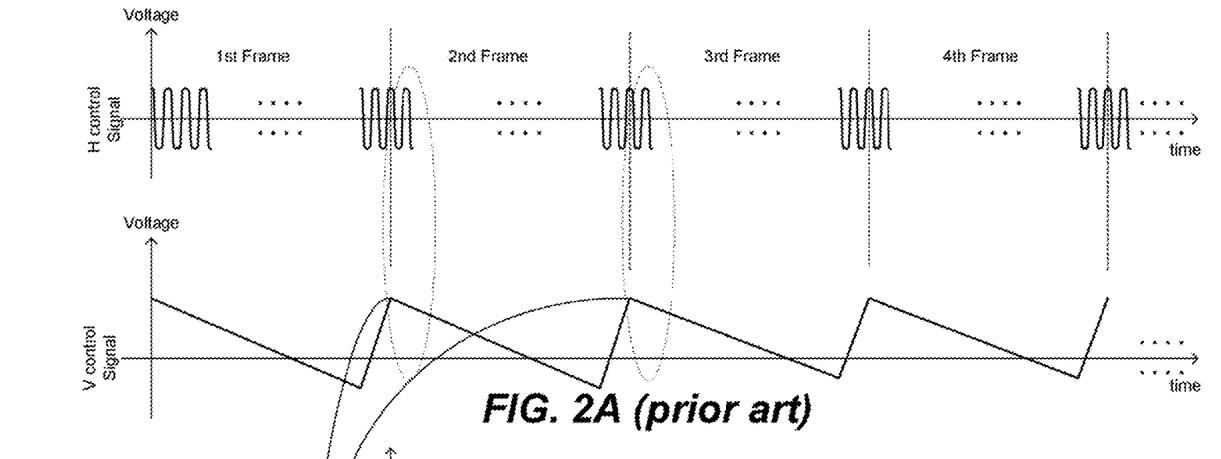
FIGS. 2A and 2B illustrate an exemplary conventional MEMS driving scheme, which can be used to achieve the scanning pattern shown in FIG. 1.
Figure 2B:
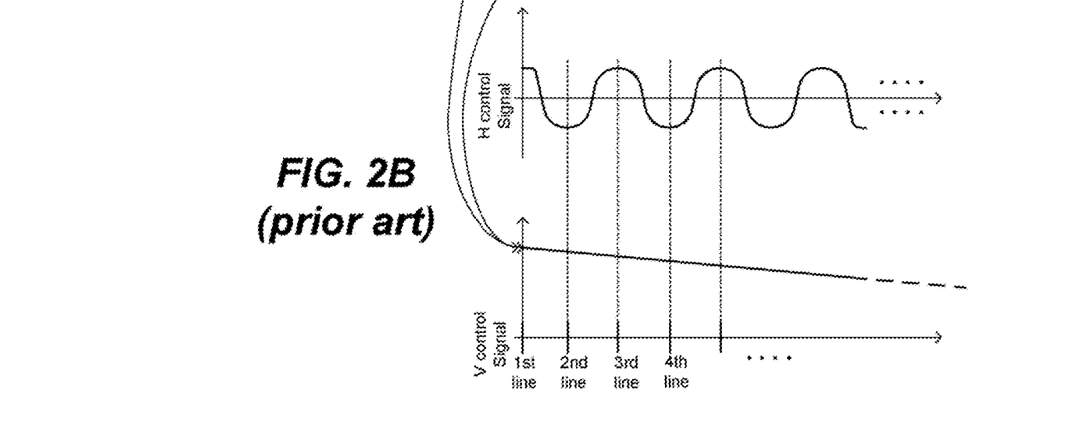

FIGS. 2A and 2B illustrate an exemplary conventional MEMS driving scheme, which can be used to achieve the scanning pattern shown in FIG. 1. In FIGS. 2A and 2B, the horizontal (H) control signal is used for horizontal control of a scanning mirror. The vertical (V) control signal is used for vertical control of a scanning mirror. A single scanning mirror can be used (which is often referred to as a bi-axial mirror), in which case the H control signal and the V control signal are used to control the same mirror. Alternatively, two uni-axial scanning mirrors can be used, in which case the H control signal controls one mirror, and the V control signal controls another mirror. FIG. 2B illustrates additional details of the portions of FIG. 2A encircled by dashed oval lines.

It would be beneficial to improve the vertical resolution at the left and right sides of an image produced by a scanning MEMS type projector display device.

DETAILED DESCRIPTION

Embodiments of the present invention, described below, address the aforementioned deficiencies of scanning projector display devices. More specifically, embodiments of the present invention can be used to improve the vertical resolution in such display devices.

In accordance with certain embodiments of the present invention, a dual frame driving scheme is used to drive a scanning display device with one image for one frame, and then an offset image for the next frame, which compensates for the vertical resolution lost, thereby improving the overall resolution. By offsetting the vertical driving waveform (which can also be referred to as the vertical control signal) by one horizontal line period, the scan beam will be able to scan the missing gap in between the two original scan lines. The first frame image will be based on the spatial position of the first frame scan scheme, and the second frame image will be based on the spatial position of the second frame scan scheme. Interpolation and/or decimation is/are performed as necessary to obtain correct spatial images. More generally, certain embodiments involve scanning a first plurality of frames (e.g., the odd frames) of an image by scanning back and forth from side to side, starting at the first line level in one of the corners (e.g., the upper left corner); and scanning a second plurality of the frames (e.g., the even frames) of the image by scanning back and forth from side to side, starting at the second line level in the same one of the corners (e.g., the upper left corner). The first plurality of frames (e.g., the odd frames) is interlaced with the second plurality of the frames (e.g., the even frames). This enables a full vertical resolution to be obtained at the sides of the image. Advantageously, these embodiments will also have the effect of achieving higher sampling points close to the center of the image, which also improves the overall resolution of the image.

Figure 3A:
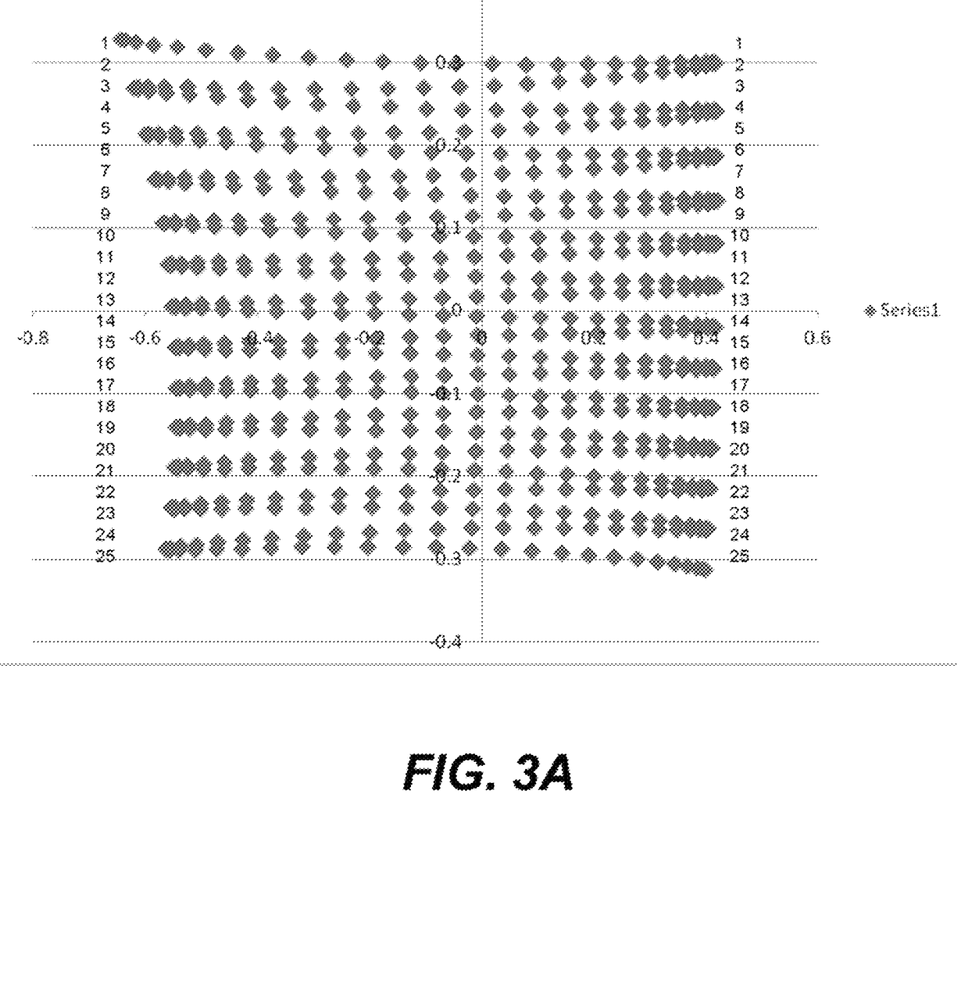
FIGS. 3A and 3B illustrate, respectively, a first frame scan scheme that starts at the first line level in the left corner, and a second frame scan scheme that starts at the second line level in the left corner, in accordance with a specific embodiment of the present invention.
Figure 3B:
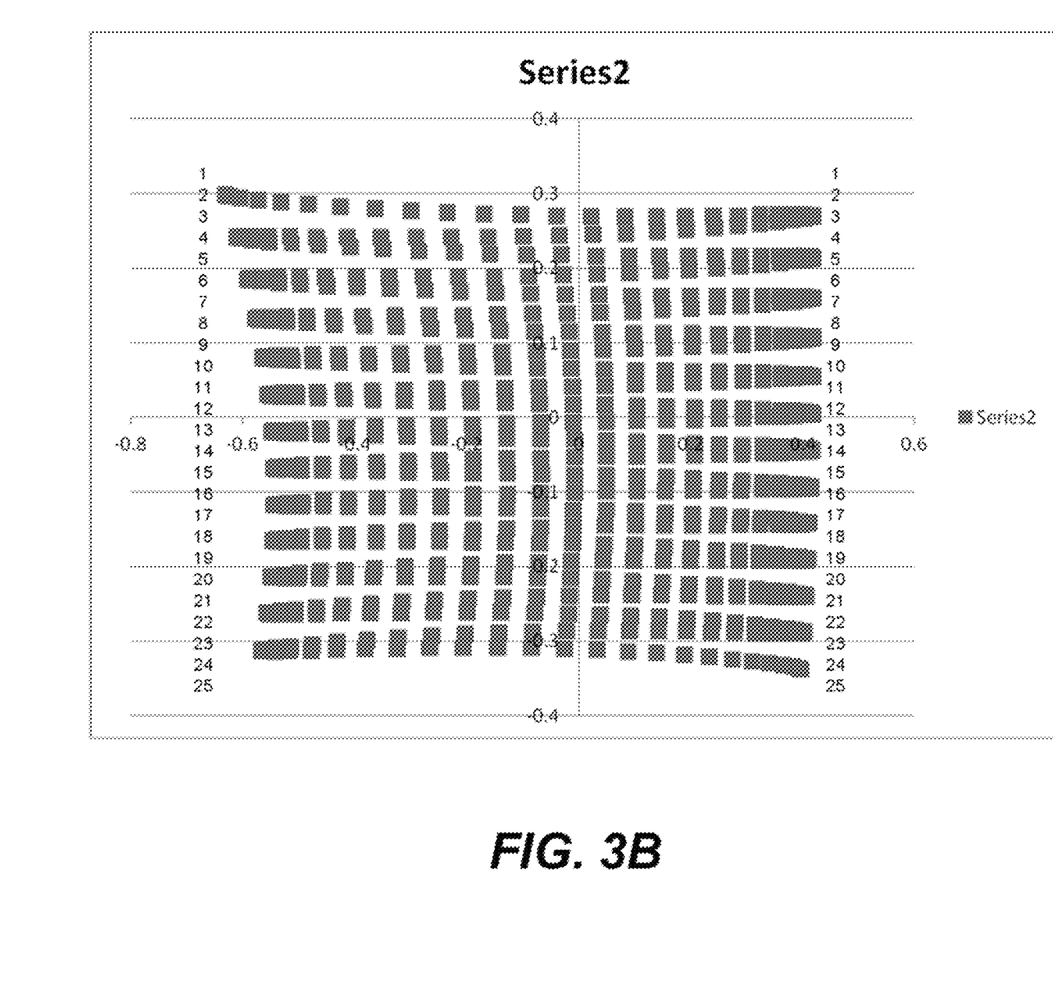
Figure 3C:
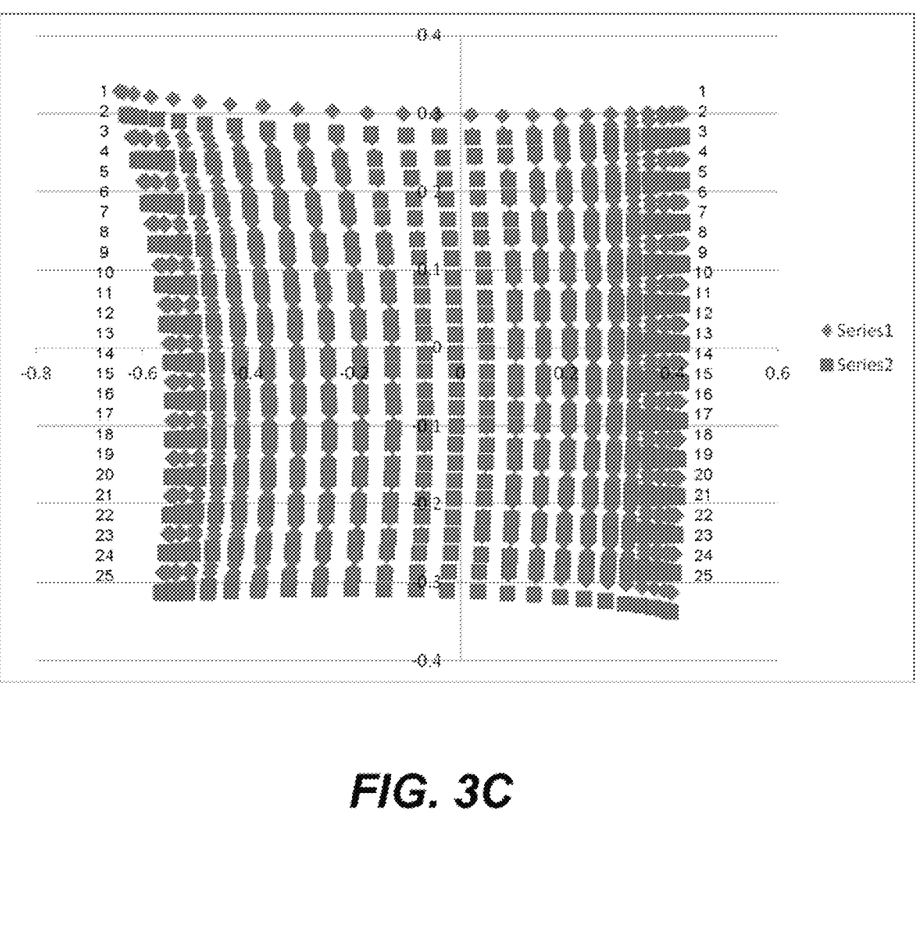
FIG. 3C illustrates the combination of the first and second frame scan schemes of FIGS. 3A and 3B, according to an embodiment of the present invention.

The spatial improvement achieved using this dual frame driving scheme can be appreciated from FIGS. 3A, 3B and 3C. In FIG. 3A, the diamond shaped plotted points illustrate the first frame scan scheme. In FIG. 3B, the rectangular shaped plotted points illustrate the second frame scan scheme, which as mentioned above, starts at the second line level of the frame, or more generally, starts at level that is vertically offset from the first line level. FIG. 3C illustrates the combination of the first and second frame scan schemes of FIGS. 3A and 3B. As can be appreciated from FIG. 3C, by starting every other frame at a level that is vertically offset from the first line level, the desired resolution (e.g., 25×25 pixels) is achieved at the left and right sides of the image, and even higher resolution is achieved near the center of the image.

Certain embodiments of the present invention are related to driving techniques for periodic control, which can be used to achieve the scanning scheme described above with reference to FIGS. 3A, 3B and 3C. Scanning mirror(s) are typically controlled using a sine wave periodic signal to resonate the fast (e.g., horizontal) axis, and the slow (e.g., vertical) axis often controlled using a saw-tooth wave to create the linear moving speed. In other words, the H control signal is typically a sine wave voltage signal, and the V control signal is typically a saw-tooth voltage signal, examples of which were shown in FIGS. 2A and 2B discussed above.

The images produced using the scanning techniques described herein generally include four sides and four corners. The four sides include a left side, a right side, an upper or top side, and a lower or bottom size. The four corners include a left upper corner, a right upper corner, a left lower corner and a right lower corner. While the scanning described with reference to FIGS. 3A, 3B and 3C was generally described and shown as starting at the left upper corner, and proceeding from left-to-right, and then from right-to-left, in a zigzag manner until the scanning reaches the right lower corner, embodiments of the present invention are not limited to this specific type of scanning. For example, the scanning can alternatively start in the right upper corner, and proceed from right-to-left, and then from left-to-right, in a zigzag manner until the scanning reaches the left lower corner. For a further example, the scanning can alternatively start in the left lower corner, and proceed from left-to-right, and then from right-to-left, in a zigzag manner until the scanning reaches the upper right corner. For another example, the scanning can alternatively start in the right lower corner, and proceed from right-to-left, and then from left-to-right, in a zigzag manner until the scanning reaches the upper left corner. Other variations are also possible. For example, if the system were to be rotated 90 degrees, left-to-right and right-to-left scanning can be referred to as up-to-down and down-to-up scanning. Regardless of the system orientation, the high frequency sine wave periodic signals shall be considered the H control signals, and the lower frequency saw-tooth wave signals shall be considered the V control signals.

Figures 4A, 4B:
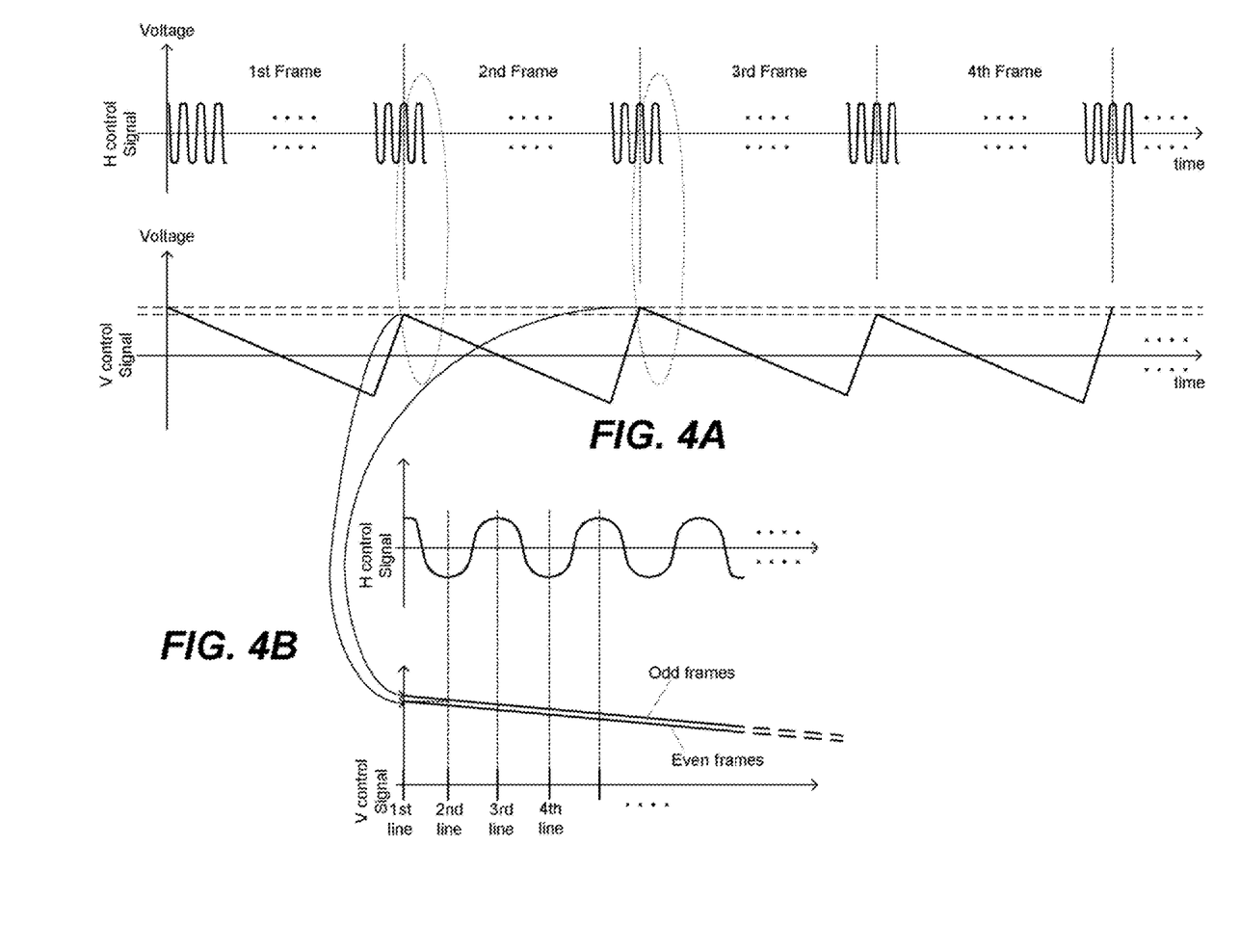
FIGS. 4A and 4B illustrate an implementation for a dual frame scan scheme, according to an embodiment of the present invention.

FIGS. 4A and 4B will now be used to describe an implementation for the dual frame scan scheme, according to specific embodiments of the present invention. In FIGS. 4A and 4B, the H control signal is used for horizontal control of a scanning mirror. The V control signal is used for vertical control of a scanning mirror. A single scanning mirror can be used (which is often referred to as a bi-axial mirror), in which case the H control signal and the V control signal are used to control the same mirror. Alternatively, two uni-axial scanning mirrors can be used, in which case the H control signal controls one mirror, and the V control signal control another mirror. FIG. 4B illustrates additional details of the portions of FIG. 4A encircled by dashed oval lines. It is noted the FIGS. 4A and 4B, and the other FIGS. included herein, are not drawn exactly to scale, but rather, have been included to illustrate the concepts of the various embodiments of the present invention.

Still referring to FIGS. 4A and 4B, the H control signal is illustrated as a sinusoidal voltage signal that transitions from its maximum amplitude to its minimum amplitude during a scan in one direction (e.g., from left-to-right), and then transitions from its minimum amplitude to its maximum amplitude during a scan in the opposite direction (e.g., from right-to-left), and thereafter repeats this pattern. This H control signal is the same for both the first and second frames of an image, and more generally, for both odd and even frames. However, as illustrated in FIGS. 4A and 4B, on the second frame (or more generally, the even frames), the V control signal starts at the second line level (or more generally, starts at a level that is vertically offset from the first line level). This causes the vertical gap from the previous scanned frame to be filled. As was mentioned above, it is also within the scope of the invention to alternatively start odd frames at a vertical offset level (e.g., the second line level), and start even frames at the first line level. In FIGS. 4A and 4B, the various line levels, including the first and second line levels are voltage levels. However, if a H control signal and the V control signal were alternatively current signals, rather than voltage signals, then the starting line levels could alternatively be starting current levels In FIGS. 4A and 4B, when beginning the scanning of a frame, the H control signal goes from high to low, and the V control signal goes from high to low. Alternative scanning control schemes, according to embodiments of the present invention, are described below with reference to FIGS. 5A and 5B, 6A and 6B, and 7A and 7B. It can be appreciated from these FIGS. that the V control signal used for odd frames of the image has substantially a same slope as, but starts at a different level than (e.g., a different voltage level than) the V control signal used for even frames of the image.

Figures 5A, 5B:
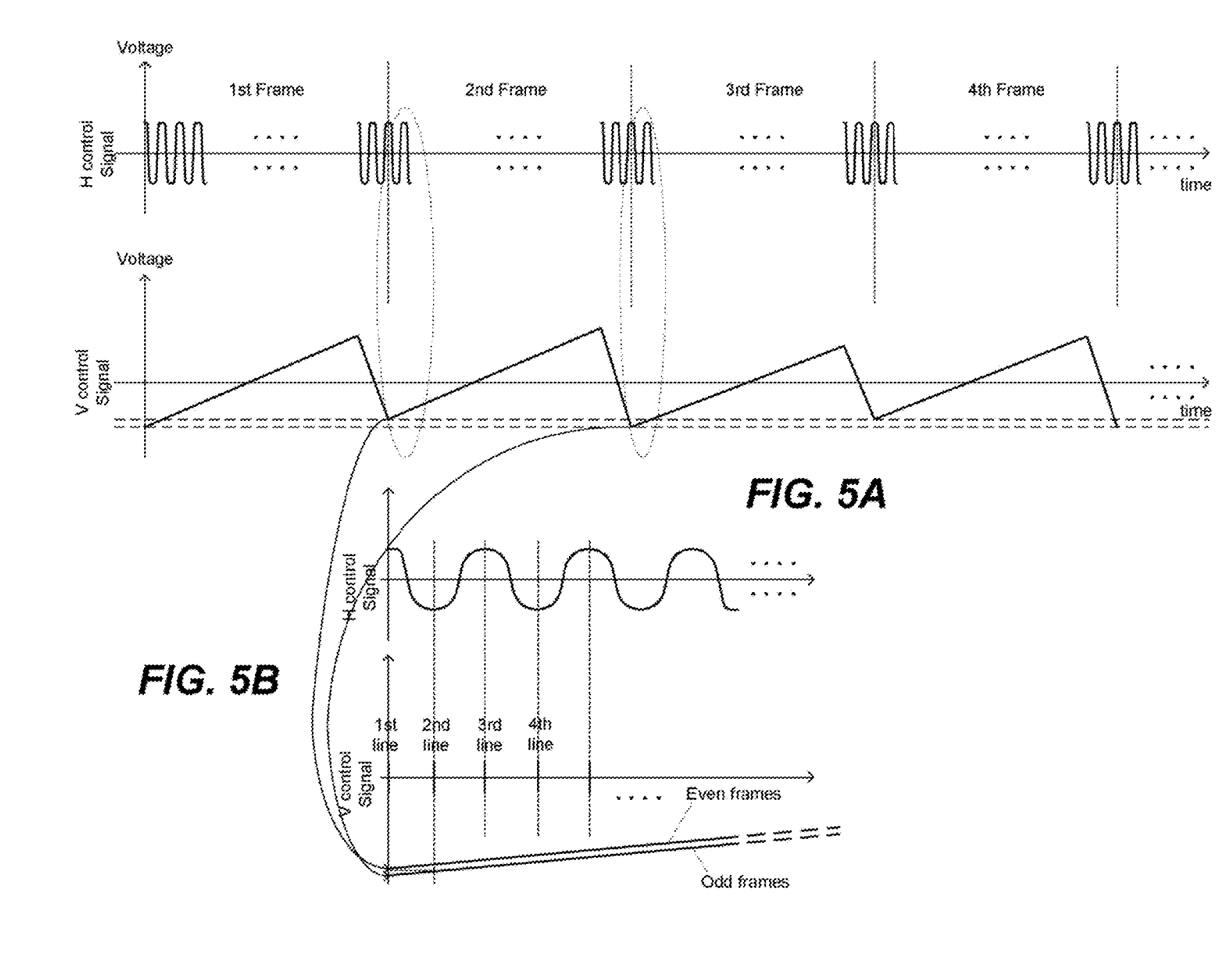
FIGS. 5A and 5B, 6A and 6B, and 7A and 7B illustrate further implementations for dual frame scan schemes, according to further embodiments of the present invention.

In FIGS. 5A and 5B, when beginning the scanning of a frame, the H control signal goes from high to low, and the V control signal goes from low to high. As was the case in FIGS. 4A and 4B, the H control signal is the same for both the first and second frames of an image, and more generally, for odd and even frames. Also, on the second frame (or more generally, the even frames), the V control signal starts at the second line level (or more generally, starts at a point that is vertically offset from the first line level). It is also within the scope of the invention to alternatively start odd frames at a vertical offset level (e.g., the second line level), and start even frames at the first line level.

Figures 6A, 6B:
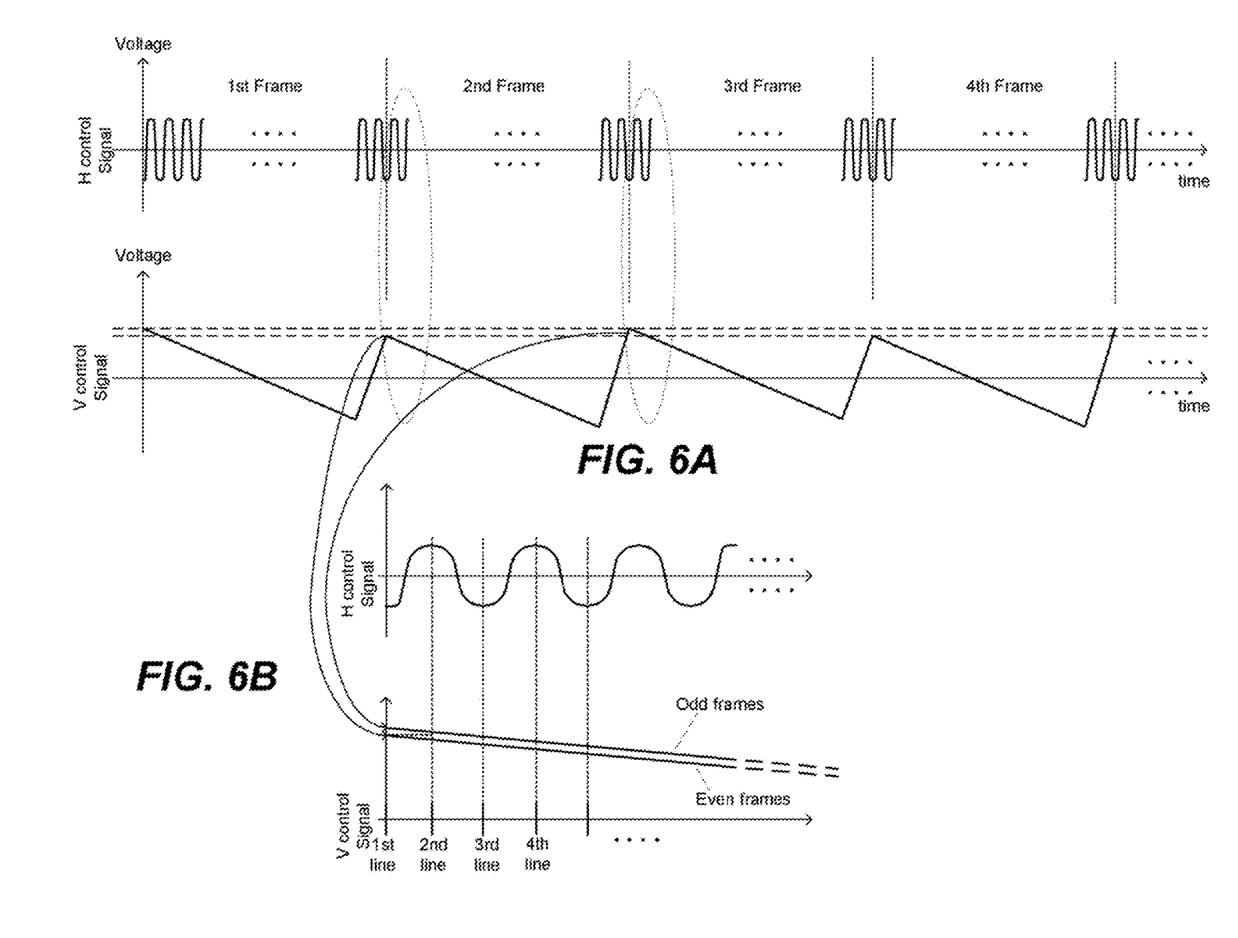

In FIGS. 6A and 6B, when beginning the scanning of a frame, the H control signal goes from low to high, and the V control signal goes from high to low. The horizontal control signal is the same for both the first and second frames of an image, and more generally, for odd and even frames. On the second frame (or more generally, the even frames), the V control signal starts at the second line level (or more generally, starts at a point that is vertically offset from the first line level). It is also within the scope of the invention to alternatively start odd frames at a vertical offset level (e.g., the second line level), and start even frames at the first line level.

Figure 7A:
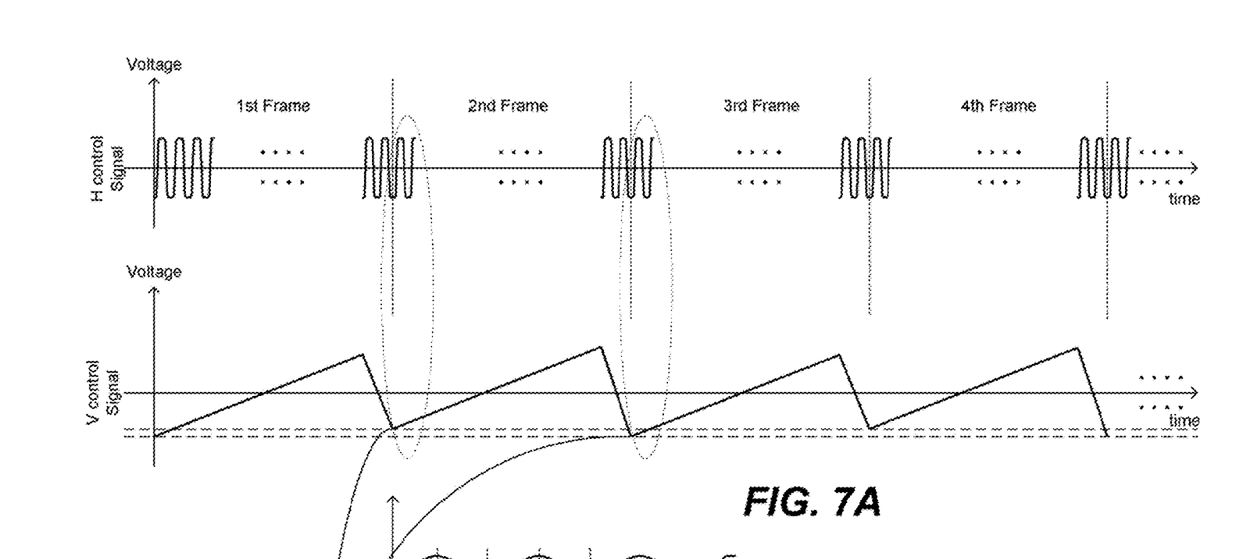
Figure 7B:
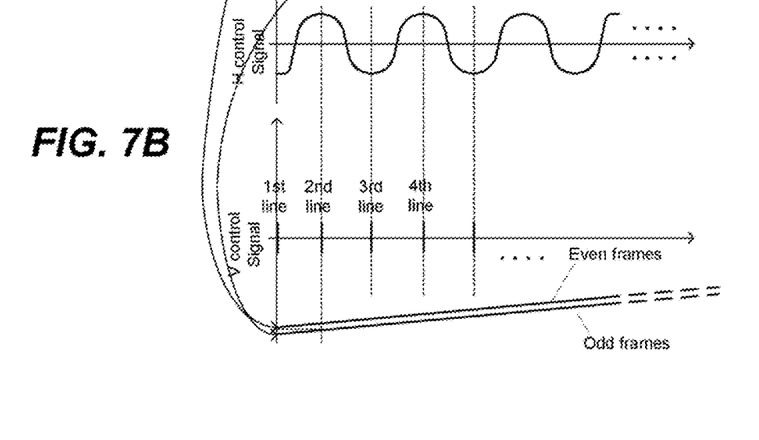

In FIGS. 7A and 7B, when beginning the scanning of a frame, the H control signal goes from low to high, and the V control signal goes from low to high. The horizontal control signal is the same for both the first and second frames of an image, and more generally, for odd and even frames. On the second frame (or more generally, the even frames), the V control signal starts at the second line level (or more generally, starts at a point that is vertically offset from the first line level). It is also within the scope of the invention to alternatively start odd frames at a vertical offset level (e.g., the second line level), and start even frames at the first line level.

Figure 8:
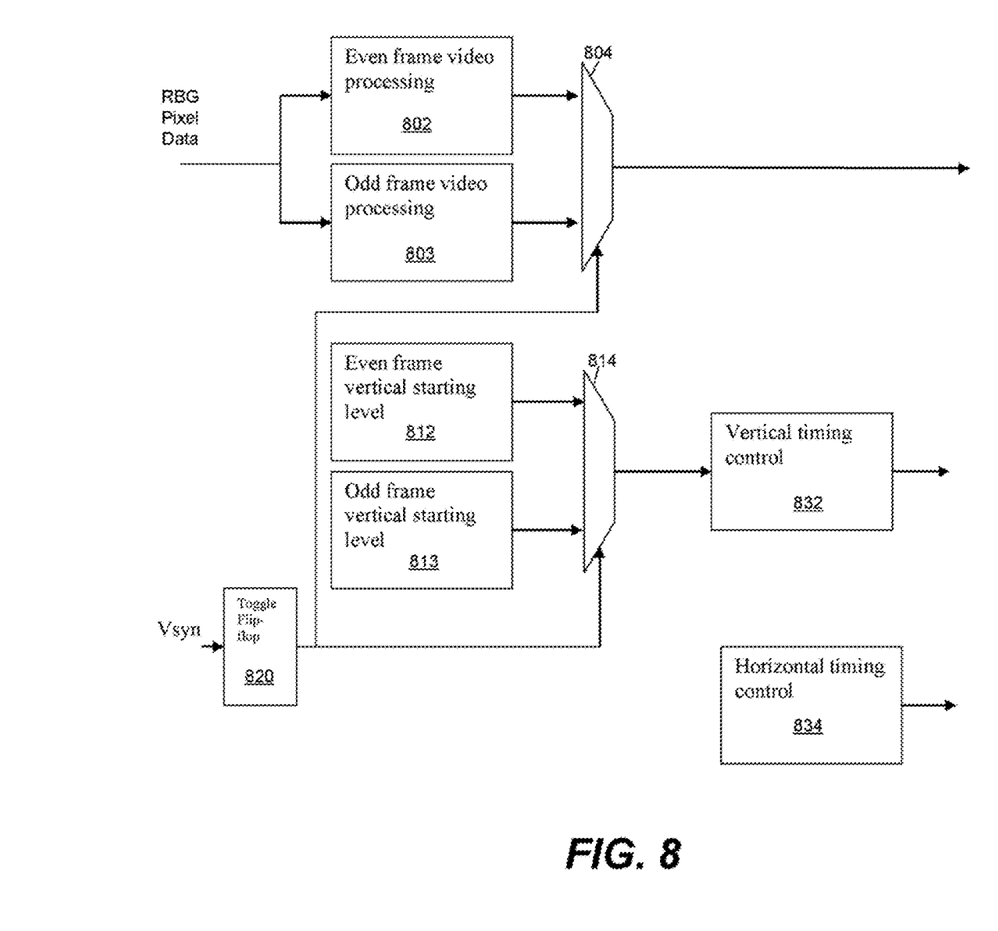
FIG. 8 illustrates a high level functional block diagram that is used to explain dual frame scan schemes according to certain embodiments of the present invention.

FIG. 8 illustrates a high level functional block diagram that is used to explain the dual frame scan schemes described above. This implementation can be optimized and easily integrated with some simple logic control without requiring duplication of portions of the video processor and controller (e.g., 1004 in FIG. 10) that perform interpolation and/or decimation. Referring to FIG. 8, blocks 802 and 803 are used to illustrate that even frames and odd frames are processed (e.g., by the video processor and controller 1004 in FIG. 10) differently, to account for the scanning starting at different vertical levels, so that when the even and odd frames are interleaved there is no noticeable jitter. Blocks 812 and 813 are used to illustrate that that vertical starting level differs for even and odd frames, as was described above with reference to FIGS. 3A-3C, 4A and 4B, 5A and 5B, 6A and 6B, and 7A and 7B.

Still referring to FIG. 8, a toggle flip-flop 820 is shown as receiving a vertical synchronization (Vsync) signal, which includes one pulse per frame, which is used to specify the ending of one frame and the beginning of the next frame. In this implementation, the toggle flip-flop 820 changes its output from high-to-low, or low-to-high, on the rising edge of each Vsync pulse. In this manner, the toggle flip-flop 820 is used to distinguish between even and odd frames, since the output of the toggle flip-flop 820 will be at one level (e.g., low) for all even frames, and at its other level (e.g., high) for all odd frames. The output of the toggle flip-flop 820 is shown as controlling a pair of multiplexers (MUXs) 804 and 814.

The MUX 804 is used to illustrate that either even frame processing of red (R), green (G) and blue (B) (RGB) pixel data, or odd frame processing of the RGB pixel data, is used, depending upon whether the data corresponds to an even frame or an odd frame that is to be scanned. However, it is not actually necessary that each frame be processing in two manners, with the results of one type of processing being selected using a MUX. Rather, the frame processing can be performed to simply alternate between even frame processing and odd frame processing.

The MUX 814 is used to illustrate that either the even frame vertical starting level, or the odd frame vertical starting level, is used, depending upon whether an even frame or an odd frame is going to be scanned. However, it is not actually necessary that a MUX be used to select between the different vertical starting levels. Rather, the V control signal can be generated to simply alternate between the two different vertical starting levels. Block 832 is used to illustrate that the vertical timing control, and more specifically the V control signal, is dependent upon the vertical starting level (or more generally, whether an odd frame or an even frame is to be scanned). Block 834 is used to illustrate that the horizontal timing control, and more specifically the H control signal, is not dependent upon whether an odd frame or an even frame is being scanned.

Figure 9A:
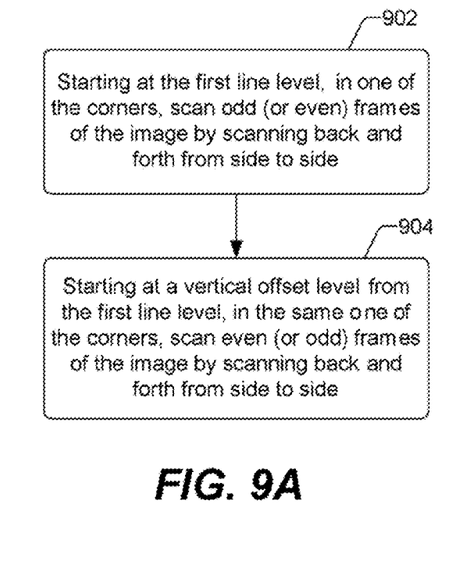
FIGS. 9A and 9B are high level flow diagrams that are used to summarize methods according to various embodiments of the present invention.
Figure 9B:
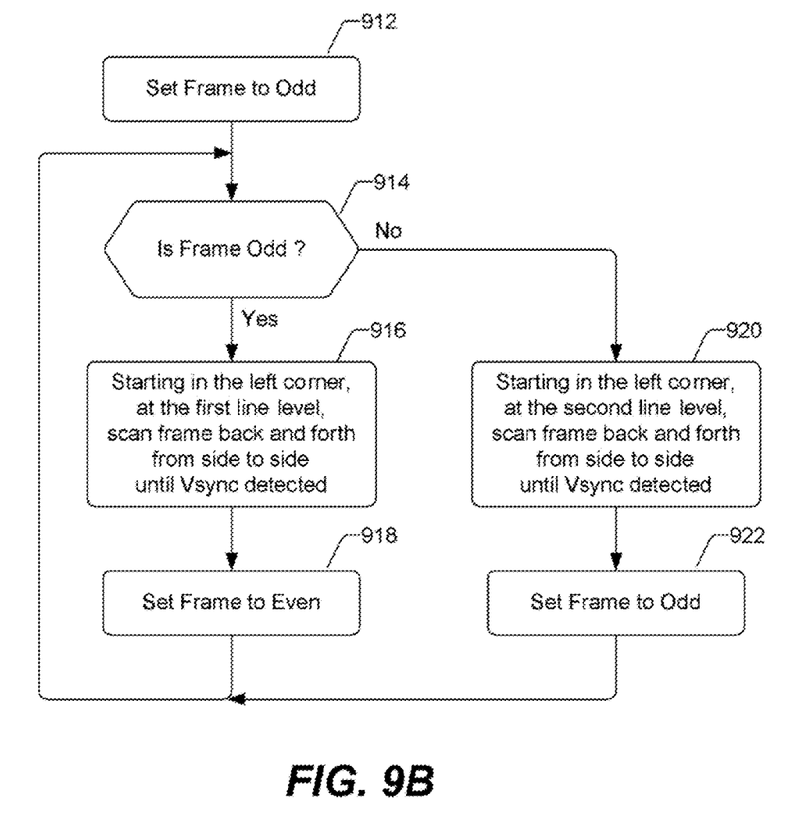

FIGS. 9A and 9B are high level flow diagrams that are used to summarize methods according to various embodiments of the present invention, for improving vertical resolution at sides of a four cornered image produced by a scanning projector display device. Referring to FIG. 9A, as indicated at step 902, a first plurality of frames of the image are scanned back and forth from side to side, starting at a first line level in one of the corners. As indicated at step 904, a second plurality of frames of the image are scanned back and forth from side to side, starting at a vertical offset level from the first line level, in the same one of the corners. Step 902 can be performed for odd frames of the image, and step 904 can be performed for even frames of the image. Alternatively, step 902 can be performed for even frames of the image, and step 904 can be performed for odd frames of the image. Either way, steps 902 and 904 are alternately performed so that the frames scanned at step 902 are interlaced with the frames scanned at step 904. The vertical offset level from the first line level can be the second line level, or more generally, some other level between the first line level and the second line level. FIG. 9B, which includes steps 912-922, provides some additional details of methods, according to specific embodiments of the present invention, for improving vertical resolution at sides of a four cornered image produced by a scanning projector display device. As can be appreciated from steps 916 and 920, Vsync pulses are used to identify when the end of a frame is reached, as well as to distinguish between odd and even frames.

Figure 10:
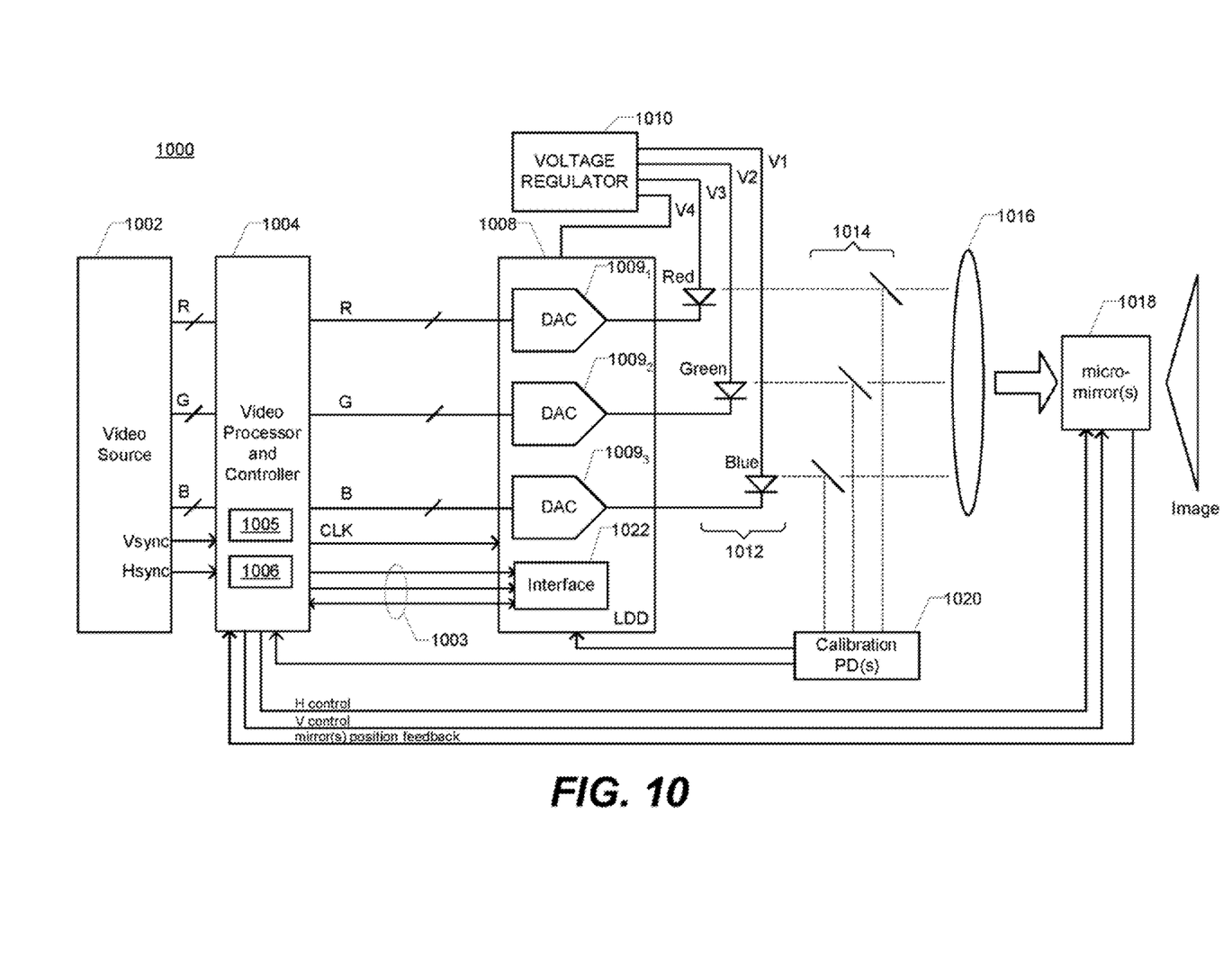
FIG. 10 illustrates an exemplary miniature projector display device, according to an embodiment of the present invention, which can implement the dual frame scan embodiments of the present invention.

FIG. 10 illustrates an exemplary miniature projector display device 1000, according to an embodiment of the present invention, which can implement the dual frame scan embodiments described above. The miniature projector device 1000 can be integrated with or attached to a portable device, such as, but not limited to, a mobile phone, a smart phone, a portable computer (e.g., a laptop or netbook), a personal data assistant (PDA), or a portable media player (e.g., DVD player). The miniature projector device 1000 can alternatively be integrated with or attached to a non-portable device, such as a desktop computer or a media player (e.g., a DVD player), but not limited thereto.

Referring to FIG. 10, the projector display device 1000 is shown as including a video source 1002, a video processor and controller 1004, a laser diode driver (LDD) 1008 and a voltage regulator 1010. Depending on the type of video source, a video analog-font-end (AFE) (not shown) can be included between the video source 1002 and the video processor and controller 1004, and the video AFE may include, e.g., one or more analog-to-digital converters (ADCs). However, a video AFE may not be needed where the video source is a digital video source. The video processor and controller 1004 receives red (R), green (G) and blue (B) pixel data, a horizontal synchronization (Hsync) signal, and a vertical synchronization (Vsync) signal from the video source 1002 (or a video AFE). The Hsync signal includes one pulse per horizontal line of a frame, which indicates the end of one line and the beginning of the next line. The Vsync signal includes one pulse per frame, which indicates the end of one frame and the beginning of the next frame.

The video processor and controller 1004 can be implemented, e.g., using an application specific integrated circuit (ASIC) and/or a micro-controller. The video processor and controller 1004 can perform scaling and/or pre-distortion of RGB pixel data before such pixel data signals are provided to the LDD 1008. Such scaling and/or pre-distortion can include interpolation and/or decimation. More generally, the video processor and controller 1004 can perform gamma correction, color space conversion, interpolation and/or decimation. The interpolation and/or decimation can be performed to map the input RGB pixel data (received from the video source 1002, or an AFE) to the output RGB pixel data that is provided to the LDD 1008, by taking into account the actual scanning trajectory and the actual position of the mirror(s) 1018. As was explained above, the processing of the RGB pixel data (including the interpolation and/or decimation) can differ based on whether an odd frame or an even frame is being processed.

The video processor and controller 1004 is shown as including a horizontal control signal generator 1005 that produces the same H control signal for odd and even frames of an image, and a vertical control signal generator 1006 that produces a first V control signal for odd frames of the image, and produces a second V control signal for even frames of the image. In specific embodiments, explained in more detail above, one of the first and second V control signals starts at a first line level, and the other one starts at a vertical offset level from the first line level. In specific embodiments, one of the first and second H control signals starts at the first line level and the other starts at the second line level.

The voltage regulator 1010 (e.g., a quad-output adjustable DC-DC buck-boost regulator) can convert a voltage provided by a voltage source (e.g., a battery or AC supply) into the various voltage levels (e.g., four voltage levels V1, V2, V3 and V4) for powering the various components of the projector display device 1000. The LDD 1008 is shown as including three digital-to-analog converts DACs 1009$_1$, 1009$_2$ and 1009$_3$ (which can be collectively referred to as DACs 1009). The LDD is also shown as including a serial interface 1022 which may receive, via a serial bus 1003, a serial enable (SEN) signal and a serial clock signal (SClk) from a serial interface of the controller 1004. Additionally, a bi-directional serial data input/output (SDIO) line of the serial bus 1003 allows the video processor and controller 1004 to write data to and read data from registers within the LDD 1008. Alternative serial buses and interfaces can be used, such as, but not limited to, an Inter-Integrated Circuit (I2C) or a Serial Peripheral Interface (SPI) bus and interface. The LDD 1008 also includes registers, and the like, which are not shown.

The DACs 1009 of the LDD 1008 drive laser diodes 1012, which can include, e.g., a red, a green and a blue laser diode, but are not limited thereto. Where the LDD 1008 is used to drive a red (R), a green (G) and a blue (B) laser diode, the LDD can be referred to as a RGB triple laser diode driver. The use of alternative light emitting elements, such as light emitting diodes (LEDs), etc., is also possible. Accordingly, as the term is used herein, a laser diode driver (LDD), unless stated otherwise, can drive light emitting elements including, but not limited to, laser diodes (e.g., the LDD may alternatively drive LEDs).

The light produced by the laser diodes 1012 or other light emitting elements can be provided to beam splitters 1014, which can direct a small percentage of the light toward one or more calibration photo-detectors (PDs) 1020, and direct the remainder of the light toward projector optics 1016, which include lenses, mirrors, reflection plates and/or the like. The light output by the optics 1016 can be provided to one or more scanning micro mirror(s) 1018. The mirror(s) 1018 can be controlled by the video processor and controller 1004 to raster-scan reflected light onto a surface, e.g., a screen, a wall, the back of a chair, etc. The mirror(s) 1018 can be implemented, for example, using a single scanning mirror (which is often referred to as a bi-axial mirror) or using two uni-axial scanning mirrors. A feedback signal is provided from the mirror(s) 1018 to the video processor and controller 1004 to provide real time position information to the video processor and controller 1004.

The dual frame schemes described above can be implemented by the video processor and controller 1004 of the projector display device 1000, to improve the resolution of the projected image. It would also be possible to separate the video processor and controller 1004 into two functional blocks or circuits, one which performs video processing and provides RGB data to the LDD 1008, and the other (e.g., a MEMS controller, or more generally a controller) which controls the scanning mirrors 1018. In other words, the H control signal generator 1005 and the V control signal generator 1006 can be part of a controller that is separate from a video processor. The H and V control signals that are used to control the scanning mirror(s) 1018 may be provided to a mirror drive unit and/or scanning platform (not shown) that changes the position of the mirror(s) in response to the H and V control signals.

The dual frame scan schemes presented herein can be used to improve the spatial resolution for back and forth display devices. These techniques can be used with various scan control methods to alter the resulting scan pattern. Embodiments of the present invention are not limited to one line shift on vertical control or one line horizontal timing shift. Rather, embodiments of the present invention can be used to apply multiple or partial line/timing shifts, as long as the video processor is in sync with the control signals. Although scanning MEMS devices are used to illustrate these dual frame scan techniques, embodiments of the present invention are not limited only to scan MEMS devices. Rather, any back and forth display scan with a vertical control can be supported. With a minimal logic cost, these techniques will add significant value to the final products.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. For example, as mentioned above, it would be possible to separate the video processor and controller 1004 into two functional blocks, one which performs video processing and provides RGB data to the LDD 1008, and the other which controls the scanning mirrors 1018. This is just one example, which is not meant to be all encompassing.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed:

1. A method for improving vertical resolution at sides of a four cornered image produced by a scanning projector display device, the method comprising:
   (a) starting at a first line level, in one of the corners, scanning a first plurality of frames of the image by scanning back and forth from side to side;
   (b) starting at a vertical offset level from the first line level, in the same one of the corners, scanning a second plurality of frames of the image by scanning back and forth from side to side;
   wherein step (a) is performed for one of odd and even frames of the image;
   wherein step (b) is performed for the other one of the odd and even frames of the image;
   wherein steps (a) and (b) are alternately performed so that the frames scanned at step (a) are interlaced with the frames scanned at step (b);
   wherein the scanning at steps (a) and (b) start in a same direction; and wherein in steps (a) and (b) vertical synchronization (Vsync) pulses are used to identify when ends of the frames are reached.

2. The method of claim 1, wherein:
step (a) is performed for odd frames of the image; and
step (b) is performed for even frames of the image; and
wherein steps (a) and (b) are alternately performed so that the odd frames scanned at step (a) are interlaced with the even frames scanned at step (b).

3. The method of claim 1, wherein:
step (a) is performed for even frames of the image; and
step (b) is performed for odd frames of the image; and
wherein steps (a) and (b) are alternately performed so that the even frames scanned at step (a) are interlaced with the odd frames scanned at step (b).

4. The method of claim 1, wherein:
step (b) comprises starting at a second line level, in the same one of the corners, scanning the second plurality of the frames of the image by scanning back and forth from side to side.

5. The method of claim 1, wherein:
step (b) comprises starting at a level between the first line level and a second line level, in the same one of the corners, scanning the second plurality of the frames of the image by scanning back and forth from side to side.

6. The method of claim 1, wherein:
the four cornered image includes a left upper corner, a right upper corner, a left lower corner and a right lower corner; and
the scanning started at steps (a) and (b) start in the same one of the left upper corner, the right upper corner, the left lower corner and the right lower corner.

7. The method of claim 1, wherein:
the scanning at steps (a) and (b) are performed by controlling one or more scanning mirrors using horizontal and vertical control signals;
the horizontal control signal used for odd frames of the image is the same as the horizontal control signal used for even frames of the image; and
the vertical control signal used for odd frames of the image differs from the vertical control signal used for even frames of the image.

8. The method of claim 7, wherein:
the vertical control signal used for odd frames of the image has substantially a same slope as, but starts at a different level than, the vertical control signal used for even frames of the image.

9. The method of claim 8, wherein:
the horizontal and vertical control signals are voltage signals;
the vertical control signal used for odd frames of the image starts at a different voltage level than the vertical control signal used for even frames of the image.

10. The method of claim 1, further comprising:
distinguishing between odd frames and even frames of the image based on a vertical synchronization (Vsync) signal.

11. A method for improving vertical resolution at the sides of a four cornered image produced by a scanning projector display device, the method comprising:
(a) starting at the first line level, in one of the corners, scanning a frame of the image by scanning back and forth from side to side until a vertical synchronization (Vsync) signal is detected;
(b) starting at a vertical offset from the first line level, in the same one of the corners, scanning a frame of the image by scanning back and forth from side to side until the Vsync signal is detected;
wherein the frame scanned at step (a) is different than the frame scanned at step (b); and
wherein steps (a) and (b) are alternately performed so that the frames scanned at step (a) are interlaced with the frames scanned at step (b); and
wherein the scanning at steps (a) and (b) start in a same direction.

12. The method of claim 11, wherein:
step (a) is performed for odd frames of the image; and
step (b) is performed for even frames of the image; and
wherein steps (a) and (b) are alternately performed so that the odd frames scanned at step (a) are interlaced with the even frames scanned at step (b).

13. The method of claim 11, wherein:
step (a) is performed for even frames of the image; and
step (b) is performed for odd frames of the image; and
wherein steps (a) and (b) are alternately performed so that the even frames scanned at step (a) are interlaced with the odd frames scanned at step (b).

14. The method of claim 11, wherein:
the scanning at steps (a) and (b) are performed by controlling one or more scanning mirrors using horizontal and vertical control signals;
the horizontal control signal used at step (a) is the same as the horizontal control signal used at step (b); and
the vertical control signal used at step (a) differs from the vertical control signal used at step (b).

15. The method of claim 11, wherein:
the vertical control signal used at step (a) has a substantially same slope as, but starts at a different level than, the vertical control signal used at step (b).

16. A controller that controls a scanning projector, comprising:
a horizontal control signal generator that produces the same horizontal control signal for odd and even frames of an image; and
a vertical control signal generator that produces a first vertical control signal for odd frames of the image, and produces a second vertical control signal for even frames of the image;
wherein one of the first and second vertical control signals starts at a first line level;
wherein the other one of the first and second vertical control signals starts at a vertical offset level from the first line level; and
wherein the first and second vertical control signals cause scanning of the odd and even frames to start in a same corner of the image in a same direction.

17. The controller of claim 16, wherein the other one of the first and second vertical control signals starts at a second line level.

18. The controller of claim 16, wherein the first and second vertical control signals are saw-toothed waveforms have substantially the same slope, but start at different starting levels.

19. A system, comprising:
a controller configured to produce horizontal and vertical control signals that are used to control one or more scanning mirrors,
wherein the same horizontal control signal is produced for odd and even frames of an image; and
wherein a first vertical control signal for odd frames of the image, and a second vertical control signal for even frames of the image;

wherein one of the first and second vertical control signals starts at a first line level;

wherein the other one of the first and second vertical control signals starts at a vertical offset level from the first line level; and wherein the first and second vertical control signals cause scanning of the odd and even frames to start in a same corner of the image in a same direction; and a driver configured to drive light emitting elements that produce light beams that are reflected by the one or more scanning mirrors.

20. The system of claim 19, further comprising:

red, green and blue light emitting elements that are driven by the driver.

* * * * *